(12) United States Patent
Luo et al.

(10) Patent No.: US 12,079,085 B2
(45) Date of Patent: Sep. 3, 2024

(54) MEMORY SYSTEMS AND OPERATING METHODS THEREOF

(71) Applicant: Yangtze Memory Technologies Co., Ltd., Hubei (CN)

(72) Inventors: Xianwu Luo, Hubei (CN); Jiangwei Shi, Hubei (CN); Youxin He, Hubei (CN)

(73) Assignee: Yangtze Memory Technologies Co., Ltd., Wuhan (CN)

(*) Notice: Subject to any disclaimer, the term of this patent is extended or adjusted under 35 U.S.C. 154(b) by 0 days.

(21) Appl. No.: 18/148,865

(22) Filed: Dec. 30, 2022

(65) Prior Publication Data

US 2024/0168849 A1 May 23, 2024

Related U.S. Application Data

(63) Continuation of application No. PCT/CN2022/133312, filed on Nov. 21, 2022.

(51) Int. Cl.
*G06F 11/00* (2006.01)
*G06F 11/10* (2006.01)
*G06F 13/16* (2006.01)

(52) U.S. Cl.
CPC ........ *G06F 11/108* (2013.01); *G06F 11/1096* (2013.01); *G06F 13/1673* (2013.01)

(58) Field of Classification Search
CPC . G06F 11/108; G06F 11/1096; G06F 11/1673
(Continued)

(56) References Cited

U.S. PATENT DOCUMENTS

2003/0229820 A1* 12/2003 Chatterjee .......... G06F 11/2087
714/6.32
2005/0132135 A1* 6/2005 Chien ................. G06F 11/1096
711/170

(Continued)

*Primary Examiner* — Sarai E Butler
(74) *Attorney, Agent, or Firm* — Hanley, Flight & Zimmerman, LLC

(57) ABSTRACT

In once example, a memory system includes a controller and a three-dimensional non-volatile memory that are coupled. The three-dimensional non-volatile memory includes a three-dimensional memory array. The three-dimensional memory array includes a plurality of word lines and a plurality of pages that are coupled. The controller is configured to: calculate received page data corresponding to a first word line in units of page data corresponding to one word line to obtain first RAID parity data, and store the first RAID parity data in a parity buffer space; and calculate received page data corresponding to an $(i+1)^{th}$ word line and $i^{th}$ RAID parity data to obtain $(i+1)^{th}$ RAID parity data, and store the $(i+1)^{th}$ RAID parity data in the parity buffer space, the $(i+1)^{th}$ RAID parity data overwriting the $i^{th}$ RAID parity data, i being a positive integer greater than or equal to 1.

20 Claims, 6 Drawing Sheets

---

Controller 101 calculates received page data corresponding to a first word line in units of page data corresponding to one word line to obtain first RAID parity data, and stores the first RAID parity data in a parity buffer space — 801

The controller 101 calculates received page data corresponding to an $(i+1)^{th}$ word line and $i^{th}$ RAID parity data to obtain $(i+1)^{th}$ RAID parity data, and stores the $(i+1)^{th}$ RAID parity data in the parity buffer space, the $(i+1)^{th}$ RAID parity data overwriting the $i^{th}$ RAID parity data, i being a positive integer greater than or equal to 1 — 802

(58) Field of Classification Search
USPC .......................................................... 714/1–57
See application file for complete search history.

(56) References Cited

U.S. PATENT DOCUMENTS

| | | | |
|---|---|---|---|
| 2006/0075280 A1* | 4/2006 | Edirisooriya | G06F 11/1076 |
| | | | 714/6.22 |
| 2012/0047321 A1* | 2/2012 | Yoon | G11C 11/5642 |
| | | | 711/E12.078 |
| 2015/0309744 A1* | 10/2015 | Takeuchi | G06F 11/1666 |
| | | | 714/764 |
| 2017/0242752 A1* | 8/2017 | Lee | G06F 3/0689 |
| 2018/0302329 A1* | 10/2018 | Seely | H04L 47/26 |
| 2019/0114238 A1* | 4/2019 | Nelogal | G06F 11/1076 |
| 2019/0354478 A1* | 11/2019 | Kashyap | G06F 11/1072 |
| 2021/0011750 A1* | 1/2021 | Iyer | G06F 3/0656 |
| 2023/0038237 A1* | 2/2023 | Lee | G11C 16/08 |

* cited by examiner

|  | DIE0 | | | | DIE1 | | | |  |
| --- | --- | --- | --- | --- | --- | --- | --- | --- | --- |
|  | PL0 | PL1 | PL2 | PL3 | PL0 | PL1 | PL2 | PL3 |  |
| P0 | | | | | | | | | |
| P1 | | | | | | | | | |
| P2 | | | | | | | | | |
| ⋮ | | | | | | | | | 301 |
| P33 | | | | | | | | | |
| P34 | | | | | | | | | |
| P35 | | | | | | | | | |
| P36 | | | | | | | | | |
| P37 | | | | | | | | | |
| P38 | | | | | | | | | |
| ⋮ | | | | | | | | | 302 |
| P69 | | | | | | | | | |
| P70 | | | | | | | | | |
| P71 | | | | | | | | | |
| ⋮ | | | | | | | | | ⋮ |
| P540 | | | | | | | | | |
| P541 | | | | | | | | | |
| P542 | | | | | | | | | |
| ⋮ | | | | | | | | | 303 |
| P573 | | | | | | | | | |
| P574 | | | | | | | | | |
| P575 | | | | | | | | | |

MEMORY SYSTEMS AND OPERATING METHODS THEREOF

RELATED APPLICATIONS

This application is a continuation of and claims the benefit of International Application No. PCT/CN2022/133312, filed on Nov. 21, 2022, which is hereby incorporated by reference in its entirety.

TECHNICAL FIELD

The present disclosure relates to the field of storage technologies, and in particular to a memory system and an operating method thereof.

BACKGROUND

Redundant array of independent disks (RAID) technology is widely used in memory systems. RAID technology may be understood as a technology that combines multiple disk drives into one logic unit for data redundancy processing and performance improvement to provide reliability assurance for stored data.

RAID technology is classified into different levels based on different performance. For a RAID 5 solution, a controller may generate RAID parity data based on valid data and store the RAID parity data in a disk. If a disk is damaged, the controller can recover data in the damaged disk based on the current valid data and the corresponding RAID parity data. Currently, RAID parity data calculated by a controller in a memory system is first stored in a buffer space of the controller. During storage, in a case that the amount of the RAID parity data exceeds the capacity of the buffer space, a swap operation may be used to share the limited capacity of the buffer space in a time division manner. In other words, in a process of calculating the RAID parity data and buffering RAID parity data, it may be necessary to perform multiple swap operations, or even to wait for a swap operation to end before calculation can be continued, affecting the write performance of the controller.

BRIEF DESCRIPTION OF THE DRAWINGS

To describe the technical solutions of the present disclosure more clearly, the following briefly describes the accompanying drawings required for some examples of the present disclosure. Apparently, the accompanying drawings in the following description show only drawings of some examples of the present disclosure, and a person of ordinary skill in the art may still derive other drawings from these accompanying drawings. In addition, the accompanying drawings in the following description may be considered as schematic diagrams and are not limitations on the actual size of the product, the actual procedure of the method, the actual timing of the signals, etc. involved in the examples of the present disclosure.

DETAILED DESCRIPTION

Figure 1:
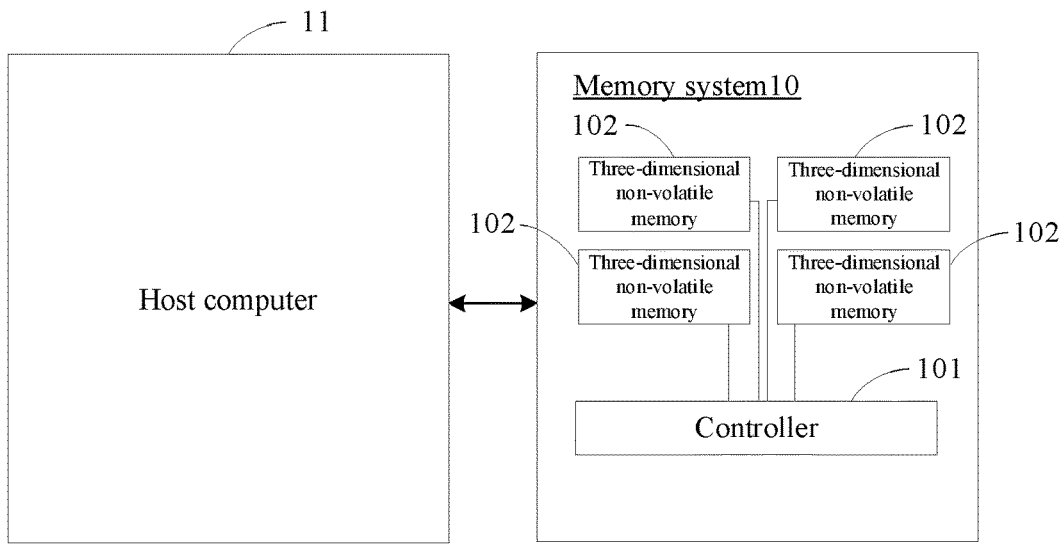
FIG. 1 is a schematic diagram of a memory system according to an example of the present application.

The following clearly and completely describes the technical solutions in some examples of the present disclosure with reference to the accompanying drawings. Apparently, the described examples are only some rather than all of the examples of the present disclosure. All other examples obtained by persons of ordinary skill in the art based on the examples provided in the present disclosure shall fall within the protection scope of the present disclosure.

In the description of the present disclosure, it needs to be understood that orientation or location relationships indicated by terms "center", "up", "down", "front", "rear", "left", "right", "vertical", "horizontal", "top", "bottom", "inside", "outside" are based on orientation or location relationships shown in the accompanying drawings, and are only used to facilitate description of the present disclosure and simplify description, but are not used to indicate or imply that the apparatuses or elements must have specific orientations or are constructed and operated by using specific orientations, and therefore, cannot be understood as a limitation to the present disclosure.

Unless the context requires otherwise, throughout the specification and claims, the term "includes" is interpreted to mean open, inclusive, i.e., "includes, but is not limited to". In the description of the specification, the terms "an example," "some examples," or "for example" are intended to indicate that a particular feature, structure, material, or characteristic associated with the example or example is included in at least one example or example of the present disclosure. The schematic representation of the above terms does not necessarily refer to the same example. In addition, the particular feature, structure, material, or characteristic described may be included in any one or more examples or examples in any appropriate manner.

The terms "first" and "second" below are used only for description, but are not intended to indicate or imply relative importance or implicitly specify a number of indicated technical features. Therefore, features defined by "first" and "second" may explicitly or implicitly include one or more features. In the examples of the present disclosure, "a plurality of" herein means "two or more" unless otherwise described.

The use of "applicable to" or "configured to" herein implies open and inclusive language that does not exclude devices that are applicable to or configured to perform additional tasks or steps.

In addition, the use of "based on" implies openness and inclusiveness, since processes, steps, calculations or other actions that are "based on" one or more of the stated conditions or values may in practice be based on additional conditions or values beyond those stated.

As used herein. "about," "approximate," or "approximately" includes the stated value as well as an average value within an acceptable range of deviation from a particular value. The acceptable range of deviation is as determined by persons of ordinary skill in the art, taking into account the measurement under discussion and the error associated with the measurement of the particular number (i.e., the limitations of the measurement system).

In the description of some examples, the expressions "coupled" and "connected" and their derivatives may be used. For example, some examples may be described using the term "connected" to indicate that two or more components are in direct physical or electrical contact with each other. For example, some examples may be described using the term "coupled" to indicate that two or more components are in direct physical or electrical contact with each other. However, the term "coupled" may also refer to two or more components that are not in direct contact with each other, but still collaborate or interact with each other. The examples disclosed herein are not necessarily limited to the content herein.

As used herein, the term "substrate" refers to the material on which subsequent layers of material can be added. The substrate itself can be patterned. The material that is added to the substrate may be patterned or may remain unpatterned. In addition, the substrate may include a variety of semiconductor materials such as silicon, germanium, gallium arsenide, indium phosphide, and the like. Alternatively, the substrate may be made of a non-conductive material such as glass, plastic, or sapphire wafers.

The term "three-dimensional non-volatile memory" refers to a semiconductor device formed by a string of memory cell transistors (referred to herein as a "memory cell string", e.g., a NAND memory cell string) arranged in an array on the main surface of a substrate or source layer and extending in a direction perpendicular to the substrate or source layer. As used herein, the term "vertically/perpendicularly" means nominally perpendicular to the main surface (i.e., the lateral surface) of the substrate or source layer.

As used in the present disclosure, the term "RAID" refers to "redundant array of independent disks" technology. It should be understood that while "RAID" refers to any array of independent disks, implementations of the present application may be implemented at the hardware level using any type of non-volatile memory device, such as a NAND flash memory device.

FIG. 1 is a schematic diagram of a memory system according to an example of the present application. A memory system 10 includes a controller 101 and a three-dimensional non-volatile memory 102. The controller 101 may communicate with a host computer 11 outside the memory system 10. The controller 101 may further be connected to the three-dimensional non-volatile memory 102 via a memory channel. In some examples, as shown in FIG. 1, the memory system 10 may include at least one three-dimensional non-volatile memory 102. Each three-dimensional non-volatile memory 102 may be managed by the controller 101.

The host computer 11 may send data to be stored in the three-dimensional non-volatile memory 102 to the controller 101. The host computer 11 may further read data from the three-dimensional non-volatile memory 102 through the controller 101. The controller 101 may process an input/output (I/O) request received from the host computer 11, and ensure, according to the I/O request, the integrity and effective storage of data to be stored. For example, the controller 101 may buffer the data received from the host computer 11, and perform RAID calculation according to the received data to obtain the RAID parity data and buffer the RAID parity data. The RAID parity data is used for restoring data damaged in an encoding or storage process. The controller 101 may further send the data received from the host computer 11 and the RAID parity data obtained through calculation to the three-dimensional non-volatile memory 102 for storage.

The host computer 11 is a dedicated processor configured to perform data processing of the three-dimensional non-volatile memory 102. For example, the host computer 11 may include a central processing unit (CPU) or a system-on-chip (SoC), for example, an application processor. Data is transmitted between the host computer 11 and the controller 101 by using at least one of various interface protocols.

For example, the interface protocols include at least one of the Universal Serial Bus (USB) protocol, the Microsoft Management Console (MMC) protocol, the Peripheral Component Interconnect (PCI) protocol, the Peripheral Component Interconnect Express (PCI-E) protocol, the Advanced Technology Attachment (ATA) protocol, the Serial ATA protocol, the Parallel ATA protocol, the Small Computer System Interface (SCSI) protocol, the Integrated Drive Electronics (IDE) protocol, or the Firewire protocol.

In some implementations, the controller 101 may be configured to control operations in the three-dimensional non-volatile memory 102, for example, a read operation, a write operation, an erase operation, an encoding operation, or the like. The controller 101 may also be configured to manage various functions with respect to the data stored or to be stored in the three-dimensional non-volatile memory 102 including, but not limited to, bad-block management, garbage collection, logical-to-physical address conversion, wear leveling, and the like. In some implementations, the controller 101 is further configured to process error correction codes (ECCs) with respect to the data read from the three-dimensional non-volatile memory 102 or written into the three-dimensional non-volatile memory 102. Certainly, the controller 101 may also perform any other appropriate functions on the three-dimensional non-volatile memory 102, for example, formatting the three-dimensional non-volatile memory 102. This is not specifically limited in the examples of the present application.

In some implementations, the controller 101 may control the operations in the three-dimensional non-volatile memory 102 by using generated control signals, to control the striping, calculation or storage of the data in the three-dimensional non-volatile memory 102. Alternatively, the controller 101 may receive signals used for the operations in the three-dimensional non-volatile memory 102 from the host computer 11, to control the striping, calculation or storage of the data in the three-dimensional non-volatile memory 102.

In some implementations, the controller 101 may have different modules in a single apparatus. The single apparatus is, for example, an integrated circuit chip such as an application specific integrated circuit (ASIC) or a field programmable gate array (FPGA), or a single apparatus having a dedicated function. In some implementations, the components of the controller 101 may be provided in an integrated device or distributed at different locations but communicate with each other through a network.

In some examples, the three-dimensional non-volatile memory 102 in the present disclosure may be a flash memory, for example, may be a NAND flash memory. The NAND flash memory may also be referred to as a flash memory or a NAND for short. Certainly, the three-dimensional non-volatile memory 102 in the present disclosure may be another memory. This is not limited in the present application. Only an example in which the three-dimensional non-volatile memory 102 is a NAND flash memory is used for description.

Figure 2:
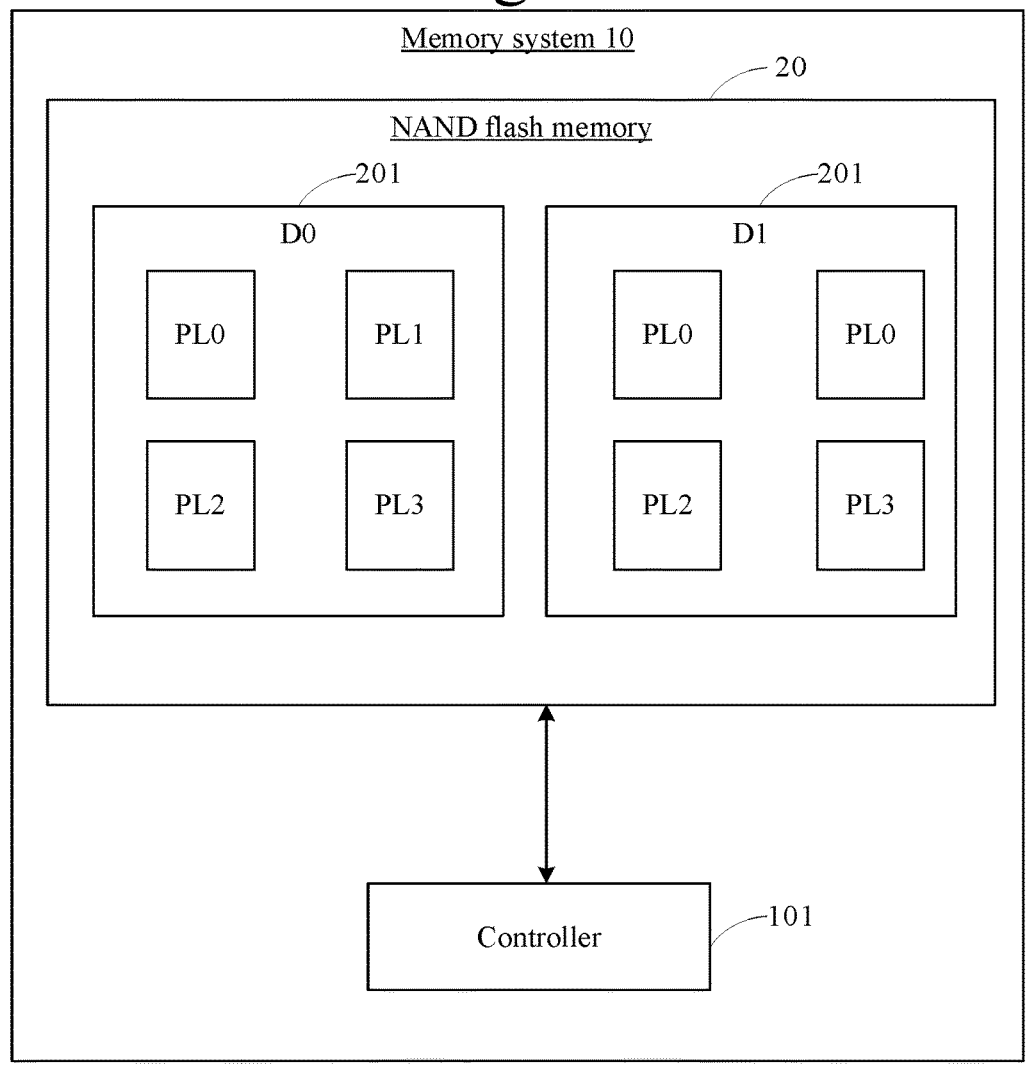
FIG. 2 is a schematic structural diagram of a NAND flash memory according to an example of the present application.

As shown in FIG. 2, FIG. 2 is a schematic structural diagram of a NAND flash memory according to an example of the present application. To increase storage capacity, the NAND flash memory 20 generally includes a plurality of dies 201, for example, D0 and D1. Each DIE 201 has a plurality of planes (PL), for example, PL0, PL1, PL2, and PL3.

Each PL may include one or more memory blocks. Each memory block may be further divided into a plurality of strings (STRs). Each STR includes memory cells configured to store an upper page (UP) data part, a middle page (MP) data part, and a lower page (LP) data part. The memory cells are coupled to a plurality of word lines (WL) arranged vertically and a plurality of bit lines (BL) arranged horizontally. Structurally, each STR may include a plurality of gate conductive layers extending transversely. One memory block includes a plurality of gate conductive layers vertically stacked in a plurality of levels, and each gate conductive layer is coupled to memory cells transversely distributed in a plurality of pages in the STRs in the memory block. As a number of gate conductive layers keeps increasing in a vertical direction, the storage capacity of the NAND flash memory increases accordingly, and the space between adjacent gate conductive layers becomes smaller, resulting in significant interference between adjacent gate conductive layers.

To improve the integrity and readability of memory cells, RAID 5 has been widely used in NAND flash memories. RAID 5 divides memory data in a memory block into a plurality of data parts by using striping in the memory block, performs an XOR operation between data parts in a stripe to generate corresponding parity check data, and stores the parity check data in the memory cell. It may be understood that one stripe includes data parts located in two dimensions. One stripe includes data that is transversely located across different memory blocks of different DIEs and different PLs and is vertically located in different levels in the same memory block. In other words, in a transverse direction, one stripe may include data parts at the same location in different PLs. In a vertical direction, one stripe may include data parts at the same location in different levels. The data parts include parity check data of the stripe. In a case that programming fails in one data part of the stripe, an XOR operation may be performed by using the parity check data of the stripe and the remaining data parts in the stripe to restore damaged data. For example, for a stripe having 128 data parts, 127 data parts are configured to store memory data, and one data part is configured to store parity check data of the stripe. Therefore, an error correction capability using RAID 5 with such a striping configuration may be described as (127+1). That is, one parity check data part protects 127 memory data parts.

A triple-level cell (TLC) NAND is used as an example. As shown in Table 1, Table 1 shows part or all of memory data to be stored in the three-dimensional non-volatile memory 102. The memory data requires a RAID calculation operation by the controller 101 before being stored in the three-dimensional non-volatile memory 102. In an example, it is assumed that the memory data is to be stored in two DIEs (DIE0 and DIE1). Each DIE includes four PLs: PL0, PL1, PL2, and PL3. Each PL includes six STRs: STR0, STR1, STR2, STR3, STR4, and STR5. Each STR includes memory cells configured to store an UP data part, an MP data part, and an LP data part. The memory cells are coupled to a plurality of word lines arranged vertically.

For ease of description, in Table 1, the word lines are labeled with word line numbers, for example, WL0, WL1, and the like. Moreover, to facilitate illustration, data parts (for example, the UP data part, the MP data part, and the LP data part) are also numbered. For example, an LP data part that is stored in a memory cell in a zeroth string (STR0) and is coupled to a zeroth word line (WL0) has a data number "0". An MP data part that is stored in a memory cell in the zeroth string (STR0) and is coupled to the zeroth word line (WL0) has a data number "1". An UP data part that is stored in a memory cell in the zeroth string (STR0) and is coupled to the zeroth word line (WL0) has a data number "2". Data parts stored in memory cells of the same word line coupled to the same page in different planes have the same data number. For example, data parts stored in memory cells coupled to WL0 in PL0 and PL0 have the same data number "0".

In Table 1, the number of word lines may change from 32, 64, 96, and 128 to 256. It should be noted that RAID operations are applicable to any appropriate three-dimensional non-volatile memory 102, but are not limited by specific quantities of dies, planes, strings, and word lines in the three-dimensional non-volatile memory 102. In some implementations, in each PL (for example, PL0 and PL1), a word line (for example, WL0) in each level may be coupled to 18 data parts (for example, data parts 0 to 17).

TABLE 1

| WL# | STR# | #P | DIE0 | | | | DIE1 | | | |
| --- | --- | --- | --- | --- | --- | --- | --- | --- | --- | --- |
| | | | PL0 | PL1 | PL2 | PL3 | PL0 | PL1 | PL2 | PL3 |
| WL0 | STR0 | LP | 0 | 0 | 0 | 0 | 0 | 0 | 0 | 0 |
| | | MP | 1 | 1 | 1 | 1 | 1 | 1 | 1 | 1 |
| | | UP | 2 | 2 | 2 | 2 | 2 | 2 | 2 | 2 |
| | ... | ... | ... | ... | ... | ... | ... | ... | ... | ... |
| | STR5 | LP | 15 | 15 | 15 | 15 | 15 | 15 | 15 | 15 |
| | | MP | 16 | 16 | 16 | 16 | 16 | 16 | 16 | 16 |
| | | UP | 17 | 17 | 17 | 17 | 17 | 17 | 17 | 17 |
| WL1 | STR0 | LP | 18 | 18 | 18 | 18 | 18 | 18 | 18 | 18 |
| | | MP | 19 | 19 | 19 | 19 | 19 | 19 | 19 | 19 |
| | | UP | 20 | 20 | 20 | 20 | 20 | 20 | 20 | 20 |
| | ... | ... | ... | ... | ... | ... | ... | ... | ... | ... |
| | STR5 | LP | 33 | 33 | 33 | 33 | 33 | 33 | 33 | 33 |
| | | MP | 34 | 34 | 34 | 34 | 34 | 34 | 34 | 34 |
| | | UP | 35 | 35 | 35 | 35 | 35 | 35 | 35 | 35 |

Because there is interference between WL0 and WL1, to implement protection of data, when receiving data from the host computer 11, the controller 101 may perform calculation by using RAID 5 and based on page data of data pages that respectively correspond to two word lines to obtain RAID parity data, that is, perform data protection by using page data corresponding to two word lines.

Figures 3, 4:
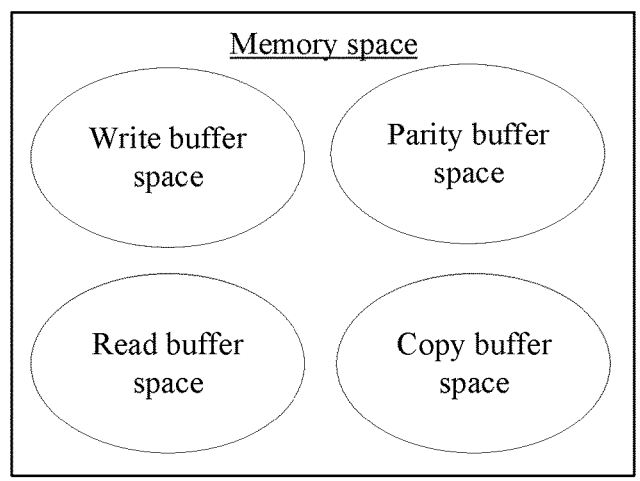
FIG. 3 is a schematic structural diagram of data for which data protection is performed by using two word lines according to an example of the present application.
FIG. 4 is a schematic diagram of a type of a memory space according to an example of the present application.

In an example, for example, in a TLC NAND including two DIEs, one word line and 18 pages are coupled. Each page includes one parity page and 127 data pages. RAID parity data in the parity page is obtained through calculation of the 127 data pages in the pages. That is, the one parity page may be used for protecting the 127 data pages. Therefore, two word lines correspond to 36 parity pages. The 36 parity pages form one round. As shown in FIG. 3, FIG. 3 shows 576 page lines in DIE0 and DIE1, denoted as P0 to P575. Each page line includes pages of a plurality of PLs. A round 0 (301) includes P0 to P35, a round 2 (302) includes P36 to P71, . . . , and a round 16 (303) includes P540 to P575. That is, it takes 16 rounds to store 576 pages. The 16 rounds form one fund.

When receiving the data and performing calculation to obtain the RAID parity data, the controller 101 needs to first buffer the received data and the RAID parity data, and then send the received data and the RAID parity data to the NAND flash memory for storage. Therefore, a memory space in the controller 101 is described herein first.

FIG. 4 is a schematic diagram of a type of a memory space in the controller 101. The memory space may include a read buffer space, a copy buffer space, a parity buffer (PB) space, or the like. FIG. 4 is only a schematic example and constitutes no limitation, and the controller 101 further includes another buffer space. The parity buffer space may be used for storing RAID parity data and garbage collection (GC) data.

Based on the description of FIG. 4, in an example, if a mode of RAID parity protection with two word lines is used, a memory space of 1152 KB is usually required to buffer RAID parity data and garbage collection data corresponding to two word lines. Because the parity buffer space has a limited memory space, only a memory space of 320 KB is provided for use by the RAID parity data and the garbage collection data. Therefore, the controller 101 needs to use a swap operation to share the limited parity buffer space in a time division manner.

Figure 5:
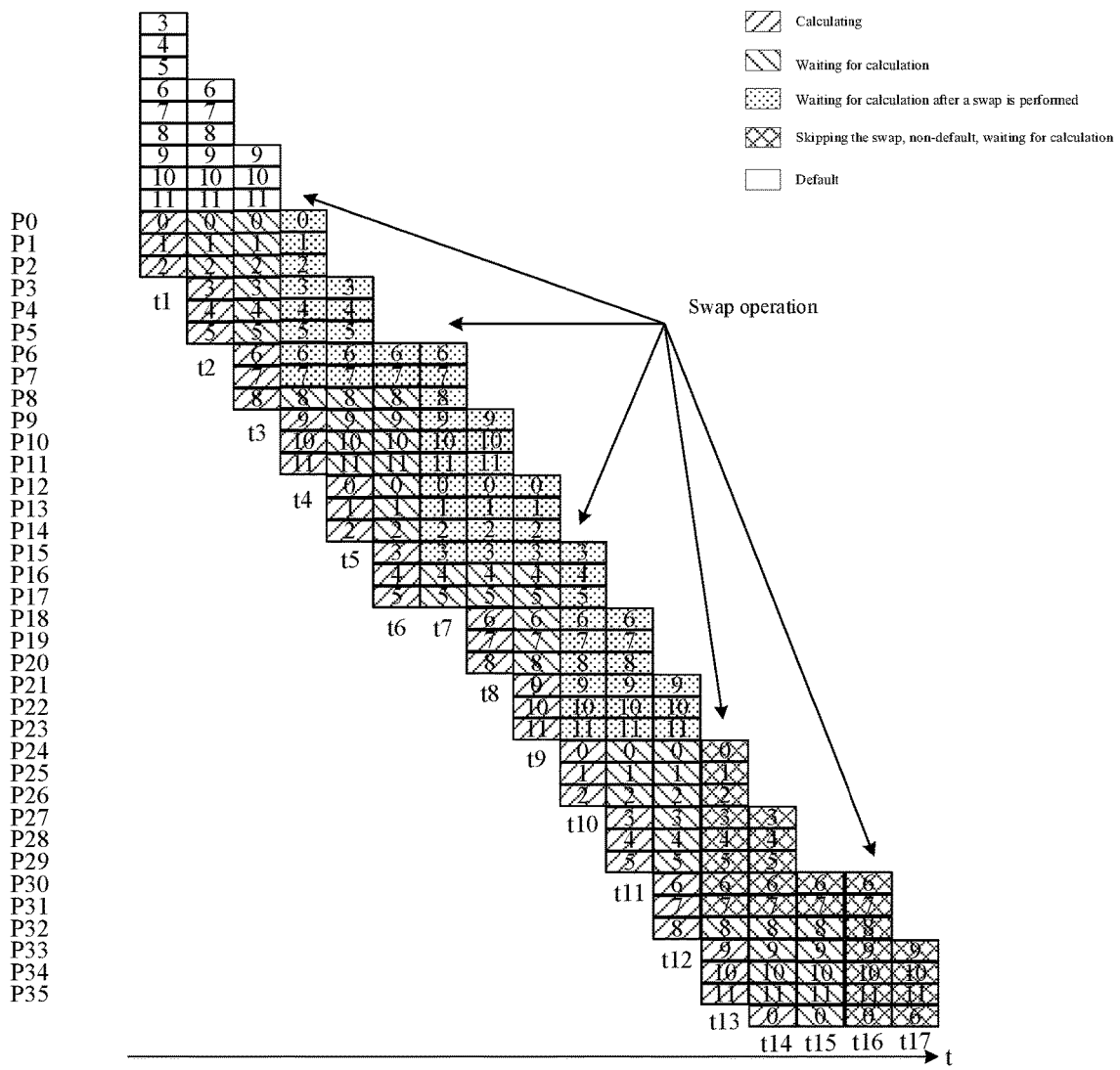
FIG. 5 is a schematic diagram of RAID parity data obtained through calculation in another round according to an example of the present application.

As shown in FIG. 5, FIG. 5 is a schematic diagram of RAID parity data obtained through calculation in one round according to an example of the present application. P0 to P35 on the vertical axis represent indices of 36 page lines in one round. It is assumed that 12 PBs are allocated when the controller 101 buffers RAID parity data. Each PB has a capacity of 16 KB, and is configured to store RAID parity data of one parity page. The horizontal axis represents the use status of every 12 PBs (PB 0 to PB 11) in different stages, for example, a moment t1 to a moment t17. For example, the controller 101 may obtain RAID parity data of three PBs, for example, P0 to P2, through calculation at the moment t1, and may obtain RAID parity data of three PBs, for example, P3 to P5, through calculation at the moment t2. In this case, RAID parity data of six PBs, for example, P0 to P5, has been stored. When RAID parity data of two PBs, for example, P6 and P7 is obtained through calculation at the moment t3, in this case, RAID parity data of eight PBs, for example, P0 to P7, has been stored. A swap operation is performed once at the moment t4. That is, when every eight PBs are filled with stored RAID parity data, the controller 101 needs to perform a swap operation once. That is, RAID parity data of eight parity pages that has been calculated is backed up into the three-dimensional non-volatile memory 102. Subsequently, the three-dimensional non-volatile memory 102 can restore RAID parity data of eight parity pages that are to be used.

Figure 6:
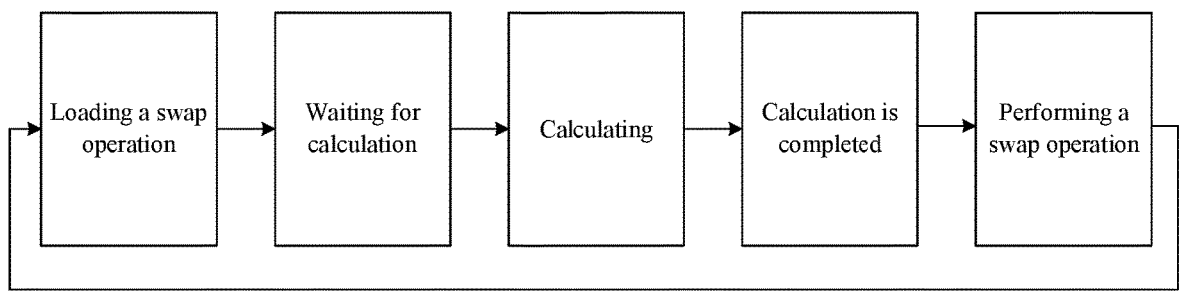
FIG. 6 is a schematic flowchart of a swap operation according to an example of the present application.

For a procedure of the foregoing swap operation, reference may be made to FIG. 6. FIG. 6 is a schematic flowchart of a swap operation. When every eight PBs have been filled with stored RAID parity data, the memory controller 101 needs to first send a program command to load a swap operation, then wait for calculation (wait encoding), perform calculation (encoding), end calculation (encoding done), and perform a program swap (prog swap).

Therefore, in one round, the controller 101 needs to perform a total of five swap operations, respectively at the moment t4, the moment t7, the moment t10, the moment t13, and the moment t16. Each swap operation includes a calculation operation of eight parity pages and a read operation of eight parity pages. During a swap operation, it is even necessary to wait for a previous swap operation to be completed before a program command can continue to be sent to perform a next swap operation. The write performance of the controller 101 is relatively low.

The examples of the present application provide an operating method of a memory system. In the method, RAID parity data is obtained through calculation in units of page data corresponding to one word line, and the RAID parity data is buffered in a parity buffer space of a buffer module. After first RAID parity data has been buffered in the parity buffer space, second RAID parity data continues to be buffered, and the second RAID parity data overwrites the first RAID parity data. In the operating method of a memory system provided in the present disclosure, RAID parity data is obtained through calculation of page data corresponding to one word line, and a parity buffer space may satisfy buffering of the RAID parity data. Therefore, a storage process of RAID parity data of the present application can reduce storage pressure and reduce a number of swap operations performed by the controller 101, thereby improving the write performance of the controller.

Figure 7:
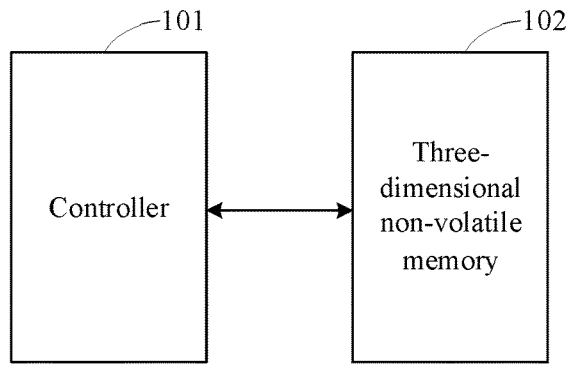
FIG. 7 is a schematic structural diagram of a controller according to an example of the present application.

As shown in FIG. 7. FIG. 7 is a schematic structural diagram of a controller according to an example of the present application.

The controller 101 may perform a calculation operation. For example, the controller 101 respectively calculates received page data corresponding to a first word line in units of page data corresponding to one word line to obtain first RAID parity data, and stores the first RAID parity data in a parity buffer space. In an example, the first RAID parity data may be obtained through calculation of 18 pieces of page data corresponding to the first word line. Therefore, the first RAID parity data may correspond to data of 18 parity pages.

In addition, the controller 101 is coupled to the three-dimensional non-volatile memory 102, and may perform a data write operation or a data read operation in response to a control signal. The controller 101 may be configured to temporarily store data transmitted between the host computer 11 and the three-dimensional non-volatile memory 102. For example, as the host computer 11 writes data into the three-dimensional non-volatile memory 102 or the host computer 11 reads data from the three-dimensional non-volatile memory 102, the controller 101 may be configured to temporarily store page data corresponding to one word line or RAID parity data calculated in units of page data corresponding to one word line. In some implementations, the controller 101 may include a static random access memory (SRAM) or a dynamic random access memory (DRAM). This is not specifically limited in the examples of the present application.

In addition, the controller 101 may provide data to and control communication with the three-dimensional non-volatile memory 102 through a data bus.

The controller 101 may include any appropriate type of general-purpose or dedicated microprocessor, digital signal processor, or microcontroller. The controller 101 may be configured as a stand-alone processor module dedicated to performing analysis of a signal or control of a scanning scheme. Optionally, the controller 101 may be configured as a shared processor module for performing other functions unrelated to signal analysis/scheme scanning. The controller 101 may include a plurality of functional units or modules that may be implemented using software, hardware, middleware, firmware, or any combination thereof. The plurality of functional units may perform operations such as a read operation, a write operation, an erase operation, a striping operation, a calculation operation, a decision making operation or a control operation on the storage of RAID parity data based on signals from the host computer 11 or pre-stored control data.

In some implementations, the controller 101 may perform configuration work, for example, set a first memory space of a write buffer space for buffering RAID parity data. In some implementations, the controller 101 may perform a swap operation.

Figure 8:
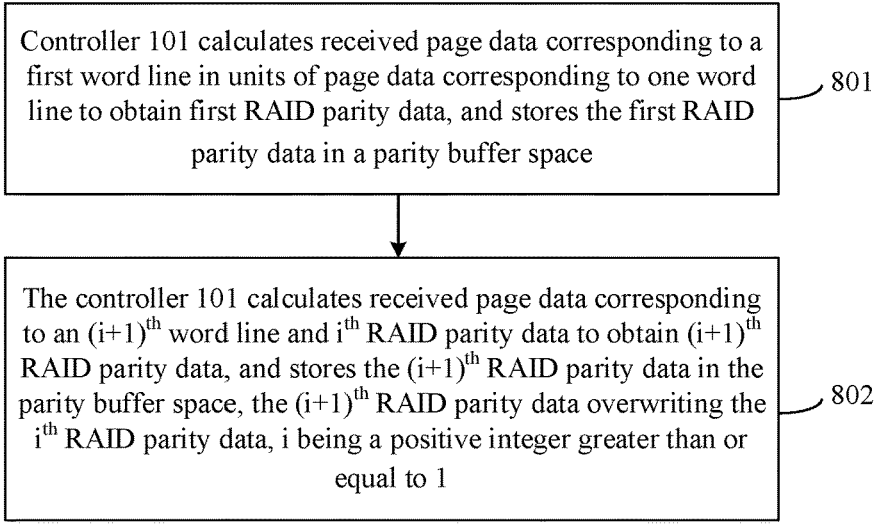
FIG. 8 is a flowchart of an operating method of a memory system according to an example of the present application.

The examples of the present application provide an operating method of a memory system, applicable to the structure of the memory system shown in FIG. 1. As shown in FIG. 8, FIG. 8 is a flowchart of an operating method of a memory system according to an example of the present application. The method includes:

801: A controller 101 calculates received page data corresponding to a first word line in units of page data corresponding to one word line to obtain first RAID parity data, and stores the first RAID parity data in a parity buffer space.

Figure 9:
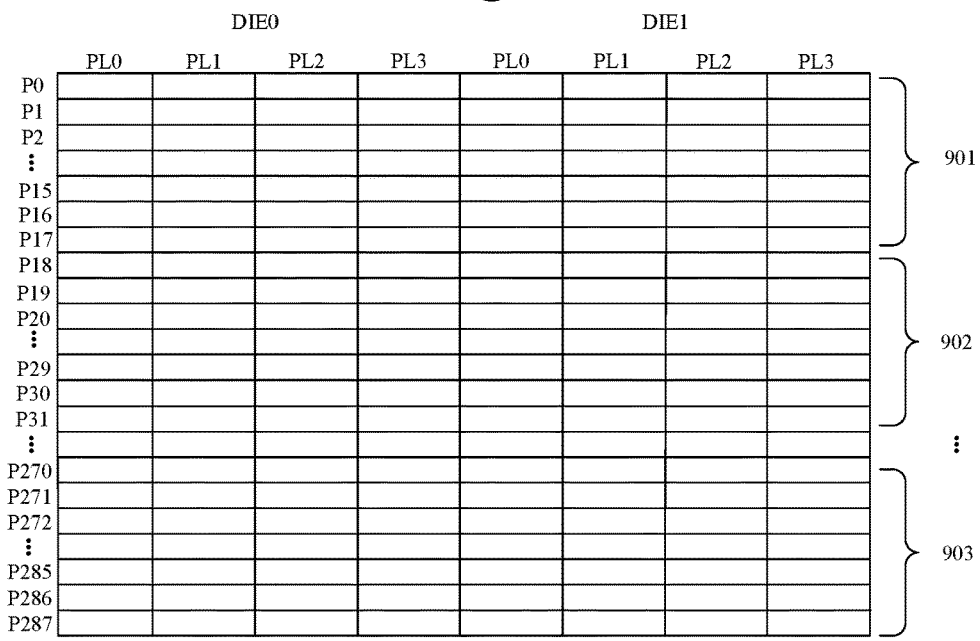
FIG. 9 is a schematic structural diagram of data for which data protection is performed by using one word line according to an example of the present application.

FIG. 9 is a schematic structural diagram of data for which data protection is performed by using one word line according to an example of the present application. The page data corresponding to one word line may be data of 18 pages. FIG. 9 shows data of 288 pages in DIE0 and DIE1. A round 0 (901) includes P0 to P17, a round 1 (902) includes P18 to P31, . . . , and a round 16 (903) includes P270 to P287. That is, 16 rounds are required to store 288 pages. The 16 rounds form one fund.

RAID parity data is obtained by performing an XOR operation on page data corresponding to one word line.

In some examples, the controller 101 may perform an XOR operation on page data corresponding to one word line to obtain first RAID parity data. In an example, if data of one page in data of 18 pages corresponding to one word line is d1, d2, d3, d4, and d5, RAID parity data corresponding to the page is $p=d1 \oplus d2 \oplus d3 \oplus d4 \oplus d5$.

In addition, the controller 101 may use a parity check algorithm to add a parity check bit to the first RAID parity data obtained through calculation. Parity check may be understood as a check performed according to whether a number of "1s" in bits of one group of transmitted binary code is an odd number or an even number. A check using an odd number is referred to as an odd check, or otherwise is referred to as an even check.

If an odd check mode is used, after an XOR operation is performed on the first RAID parity data. XOR is performed on the result and "1", so that the value of an odd check bit in the first RAID parity data may be obtained. If an even check mode is used, after an XOR operation is performed on the first RAID parity data, XOR is performed on the result and "0", so that the value of an even check bit in the first RAID parity data may be obtained. Therefore, the accuracy of the first RAID parity data can be ensured.

In addition, for the RAID parity data, another operation other than an XOR operation may be performed on page data corresponding to one word line. This is not limited in the present application.

It needs to be noted that the page data corresponding to one word line may be data pre-written by the host computer 11 into the three-dimensional non-volatile memory 102. For example, the page data may be binary digital data of symbols, a text, numbers, speech, an image, a video or a combination thereof.

802: The controller 101 calculates received page data corresponding to an (i+1)th word line and ith RAID parity data to obtain (i+1)th RAID parity data, and stores the (i+1)th RAID parity data in the parity buffer space, the (i+1)th RAID parity data overwriting the ith RAID parity data, i being a positive integer greater than or equal to 1.

After storing the first RAID parity data in the parity buffer space, the controller 101 may perform a calculation operation on received page data corresponding to a second word line and the first RAID parity data to obtain second RAID parity data. It is assumed that the first word line corresponds to page data of 18 pages, which are respectively D1, D2, . . . , and D18. An XOR operation is performed on the page data of D1 to D18 respectively. A group of RAID parity data is correspondingly obtained for the page data of each page. The first RAID parity data may include 18 groups of RAID parity data, which are respectively P1, P2, . . . , and P18. The second word line also corresponds to page data of 18 pages, which are respectively D19, D20, . . . , and D36. In this case, an XOR operation is performed on the data D19 of the first page in the page data corresponding to the second word line and the first group of RAID parity data P1 in the 18 groups of RAID parity data to obtain the first group of RAID parity data P19 in the second RAID parity data. That is, $P19=D19 \oplus P1$. The remaining groups of RAID parity data in the second RAID parity data may be obtained by using a method similar to that of obtaining the first group of RAID parity data in the second RAID parity data. Subsequently, the controller 101 stores the second RAID parity data obtained through calculation in the parity buffer space overwriting the first RAID parity data.

Figure 10:
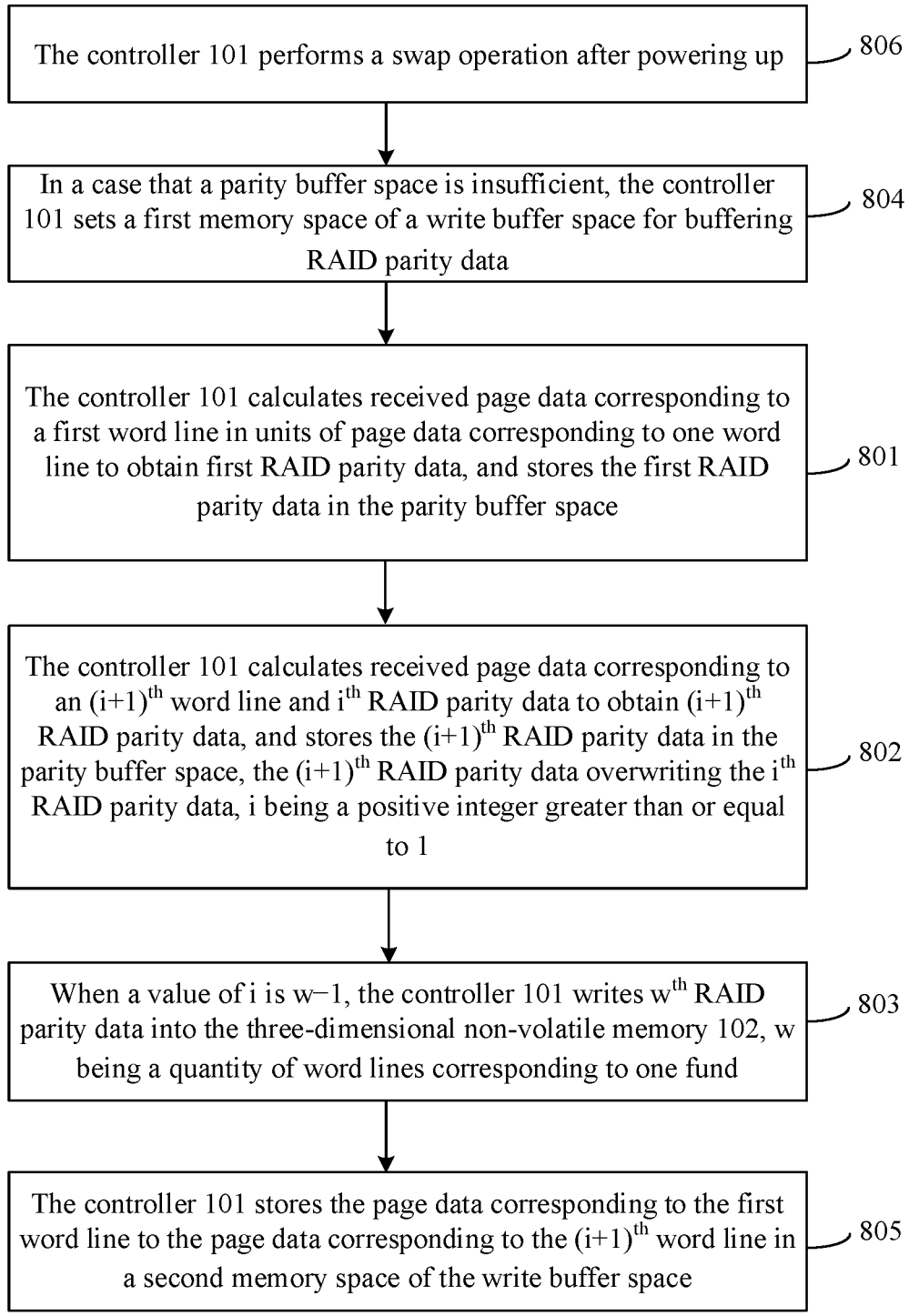
FIG. 10 is a flowchart of an operating method of a memory system according to an example of the present application.

Therefore, it may be deduced that after storing the ith RAID parity data in the parity buffer space, the controller 101 may calculate received page data corresponding to the (i+1)th word line and the ith RAID parity data to obtain the (i+1)th RAID parity data. Optionally, as shown in FIG. 10. FIG. 10 shows another operating method of a memory system provided in the examples of the present application. The method may further include 803: when a value of i is w−1, the controller 101 writes wth RAID parity data into the three-dimensional non-volatile memory 102, w being a number of word lines corresponding to one fund.

In the examples of the present application, if one fund includes w word lines, in a case that a wth word line is the last word line in a current data storage process, after buffering the wth RAID parity data in the parity buffer space, the controller 101 sends the wth RAID parity data to the three-dimensional non-volatile memory 102. For example, if one fund includes 16 word lines, that is, when w=16, in this case, an XOR operation is performed on received page data corresponding to a 15th word line and 14th RAID parity data, so that 15th RAID parity data may be obtained. The 15th RAID parity data is stored in the parity buffer space overwriting the 14th RAID parity data. An XOR operation is performed on received page data corresponding to a 16th word line and the 15th RAID parity data, so that 16th RAID parity data may be obtained, and the 16th RAID parity data is stored in the parity buffer space overwriting the 15th RAID parity data. In this case, the controller 101 has completed calculation of RAID parity data for page data corresponding to word lines in one fund, so that the 16th RAID parity data may be sent to the three-dimensional non-volatile memory 102. If any page data corresponding to a word line in one fund is damaged, the page data may be restored according to the 16th RAID parity data and other page data corresponding to word lines in the fund.

A person skilled in the art may understand that for valid data in the three-dimensional non-volatile memory 102, due to a reason such as a physical status of a memory cell, programming interference in a storage process, or the like, valid data stored in the three-dimensional non-volatile memory 102 may be bit reversed to turn into incorrect data. Therefore, the incorrect data needs to be restored into valid data. Therefore, RAID parity data is also stored in the three-dimensional non-volatile memory 102, and valid data may be restored according to RAID parity data corresponding to the valid data, thereby improving the correctness of storing valid data in the three-dimensional non-volatile memory 102.

Optionally, before 801, the method may further include:
804: In a case that the parity buffer space is insufficient, the controller 101 sets a first memory space of a write buffer space for buffering RAID parity data.

Figure 11:
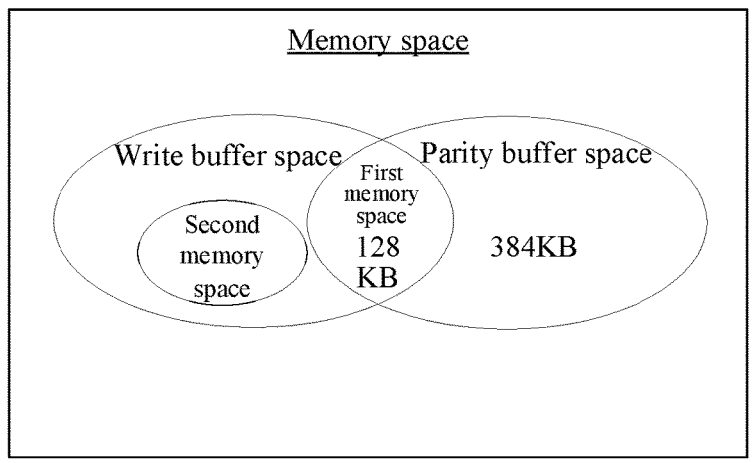
FIG. 11 is a schematic diagram of a memory space according to an example of the present application.

As shown in FIG. 11. FIG. 11 is a schematic diagram of a memory space according to an example of the present application. In an example, if a word line protection mode is used, in total a memory space of 448 KB is required for RAID parity data and garbage collection data. It is assumed that the capacity of the parity buffer space is 384 KB. The capacity of the first memory space in the write buffer space that can be allocated by the controller 101 is 128 KB, and the first memory space is used for buffering the RAID parity data. In this case, a total memory space used for storing the RAID parity data and the garbage collection data in the parity buffer space is 512 KB. The controller 101 may allocate a memory space of 448 KB from the parity buffer space for buffering the RAID parity data and the garbage collection data. The remaining memory space may be used for storing other system data.

Certainly, because the total memory space used for storing the RAID parity data and the garbage collection data in the parity buffer space is 512 KB, if a word line protection mode is used, in total a memory space required for the RAID parity data and the garbage collection data is greater than 512 KB, the controller 101 may allocate part of the memory space from the parity buffer space for buffering the RAID parity data and the garbage collection data, and the remaining memory space may be used for storing other system data. For example, in total a memory space of 576 KB is required for the RAID parity data and the garbage collection data. The controller 101 may allocate a memory space of 448 KB from the parity buffer space for buffering the RAID parity data and the garbage collection data. The part of the memory space allocated from the parity buffer space for buffering the RAID parity data and the garbage collection data preferentially ensures the storage of the RAID parity data, and the remaining memory space is used for storing the garbage collection data.

In the memory space of 448 KB in the parity buffer space, the controller 101 allocates a memory space of 18 PBs for storing the RAID parity data. Each PB occupies 16 KB. In a case that the first RAID parity data includes 18 groups of RAID parity data, in this case, it is not necessary to perform a swap operation when the parity buffer space buffers the RAID parity data, thereby implementing the continuity of buffering the RAID parity data, so that the write performance of the controller can be improved.

It needs to be noted that during the determination of the capacity of the first memory space, the use of the write buffer space should be ensured first.

Optionally, the method may further include:
805: The controller 101 stores the page data corresponding to the first word line to the page data corresponding to the (i+1)th word line in a second memory space of the write buffer space.

For example, the second memory space of the write buffer space may buffer data transferred between the host computer 11 and the three-dimensional non-volatile memory 102, that is, page data corresponding to a plurality of word lines. When the second memory space of the write buffer space buffers data, storage is performed in units of page data corresponding to one word line. Therefore, during a read or write operation between the host computer 11 and the three-dimensional non-volatile memory 102, the page data corresponding to the plurality of word lines is stored in the second memory space of the write buffer space, so that the rate of reading data from or writing data into the three-dimensional non-volatile memory 102 by the host computer 11 can be increased.

A configuration priority of the second memory space of the write buffer space is higher than that of the first memory space.

For example, while satisfying the capacity of the second memory space required to buffer the page data corresponding to the plurality of word lines, the controller 101 then allocates the first memory space to the parity buffer space for buffering RAID parity data.

In addition, in some examples of the present disclosure, if a sum of the capacity of the parity buffer space and the capacity of the first memory space is sufficient to buffer all RAID parity data, the controller 101 can buffer all RAID parity data without performing a swap operation, thereby improving the write performance of the controller.

In some examples of the present disclosure, if the sum of the capacity of the parity buffer space and the capacity of the first memory space may still be insufficient to buffer all RAID parity data, a swap operation may be performed to share the first memory space and the parity buffer space in a time division manner. However, compared with a two-word line protection mode, because a number of swap operations is reduced, the write performance of the controller can still be improved.

In some examples of the present disclosure, the parity buffer space includes a parity data buffer space and a garbage collection buffer space, the parity data buffer space is used for buffering the RAID parity data, the garbage collection buffer space is used for buffering garbage collection data, and the garbage collection data includes RAID parity data corresponding to data that needs to be collected in page data.

In an example, after allocating the first memory space of 128 KB to the parity buffer space from the write buffer space, the controller 101 may allocate 10 PBs for storing garbage collection data.

For example, because an amount of invalid data stored in a plurality of data blocks in the three-dimensional non-volatile memory 102 may increase along with increasing processing of encoding commands from the host computer 11, to repeatedly use data blocks for storing such invalid data, a GC operation may be performed. For example, the controller 101 may perform the GC operation to change a data block in which valid data is stored into an idle block. In addition, it may be set in the controller 101 that a GC mechanism is triggered if a number of remaining idle blocks is equal to or less than a threshold. When the GC mechanism is triggered, the controller 101 may recognize closed blocks in the plurality of data blocks in the three-dimensional non-volatile memory 102, and use a closed block with a number of valid pages being less than a threshold in the closed blocks as a sacrifice block. The controller 101 may copy valid data in the sacrifice block, and store the valid data in a target block that has not undergone an encoding operation and is used as an idle block. After the valid data is copied and stored in the target block, the controller 101 may erase the sacrifice block.

During the GC operation, to move data from a closed block to an idle block in the three-dimensional non-volatile memory 102, the controller 101 may read data from the closed block in the three-dimensional non-volatile memory 102, load the read data into a buffer space, and then write the data stored in the buffer space into the idle block. Because the controller 101 performs a read/write operation on the three-dimensional non-volatile memory 102, when performing the GC operation and at the same time transferring a read command or a write command from the host computer 11, the controller 101 may stop the GC operation to perform an operation of the command.

During the execution of the GC mechanism, the controller 101 labels valid data and invalid data. A method for labeling invalid data is referred to as a garbage labeling algorithm. The algorithm may include a reference counting algorithm and a root search algorithm.

In the reference counting algorithm, one memory field is maintained for each piece of data to count a number that the data has been referenced. A counter is increased by 1 once the data is referenced, and is decreased by 1 when a reference becomes invalid. When the counter reaches 0, the data is labeled as invalid data to wait for subsequent collection. In the root search algorithm, one piece of data named "GC Roots" is used as a root starting point, an object graph is traversed through a reference relationship, and a searched path is referred to as a reference chain. When there is no reference chain between one piece of data and the GC Roots, that is, the data is not reachable from the GC Roots, the data is labeled as invalid data to wait for subsequent collection.

Optionally, as shown in FIG. 10, before 801, the method further includes:

806: The controller 101 performs a swap operation after powering up.

In an example, after the controller 101 is powered up, the controller 101 may perform a procedure of loading a swap operation, to initialize the parity buffer space, the write buffer space, and the like.

In the examples of the present application, after the memory controller is powered up, a swap operation is performed. In a process of buffering RAID parity data, the parity buffer space may satisfy RAID parity data obtained through calculation based on page data corresponding to one word line. Therefore, it is not necessary to perform a swap operation in the process of buffering RAID parity data in the present application, thereby implementing the continuity of buffering RAID parity data, and improving the write performance of the controller.

In some examples, the host computer 11 may send a reset signal to the controller 101. The reset signal is used for clearing data buffered in a buffer space.

Optionally, the method further includes: after received page data corresponding to an ith word line has been calculated, continuing to perform a calculation operation on the page data corresponding to the (i+1)th word line.

Figure 12:
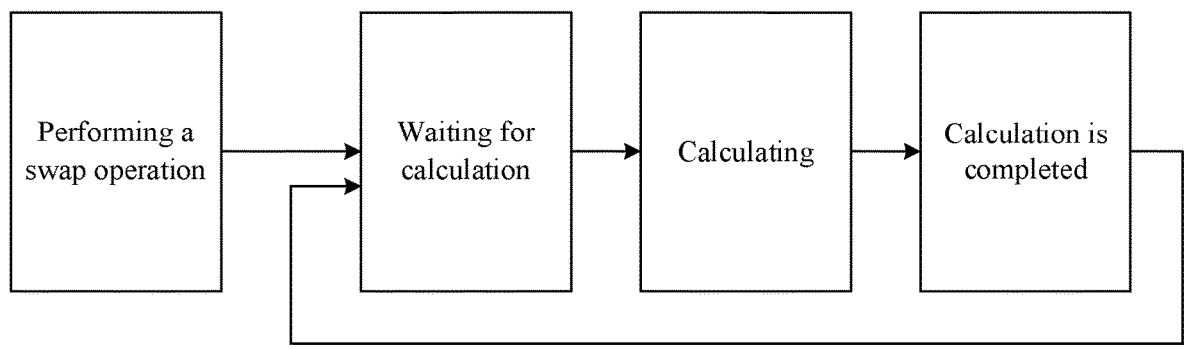
FIG. 12 is a flowchart of buffering data by a controller according to an example of the present application.

As shown in FIG. 12, FIG. 12 is a flowchart of buffering data by a controller according to an example of the present application. After the controller 101 is powered up, the controller 101 performs a procedure of loading a swap operation. After the swap operation is performed, steps such as waiting for calculation, calculation, completing calculation, and the like are performed, and then the foregoing steps are repeated. For example, for an ith word line and an (i+1)th word line, the controller 101 continuously performs the following steps: a. waiting to calculate page data corresponding to the ith word line; b. calculating the page data corresponding to the ith word line; c. completing calculation of the page data corresponding to the ith word line; d. waiting to calculate page data corresponding to the (i+1)th word line; e. calculating the page data corresponding to the (i+1)th word line; and f. completing calculation of the page data corresponding to the (i+1)th word line.

The (i+1)th RAID parity data is used for checking the page data corresponding to the rust word line to the (i+1)th word line.

In an example, in a case that the (i+1)th word line is the last word line in a current data storage process, the controller 101 may store the (i+1)th RAID parity data in the three-dimensional non-volatile memory 102. In this case, the (i+1)th RAID parity data may be used for checking the page data corresponding to the first word line to the (i+1)th word line. That is, if any data in the page data corresponding to the first word line to the (i+1)th word line is damaged, the damaged data may be restored according to the (i+1)th RAID parity data and other data corresponding to the first word line to the (i+1)th word line.

Figure 13:
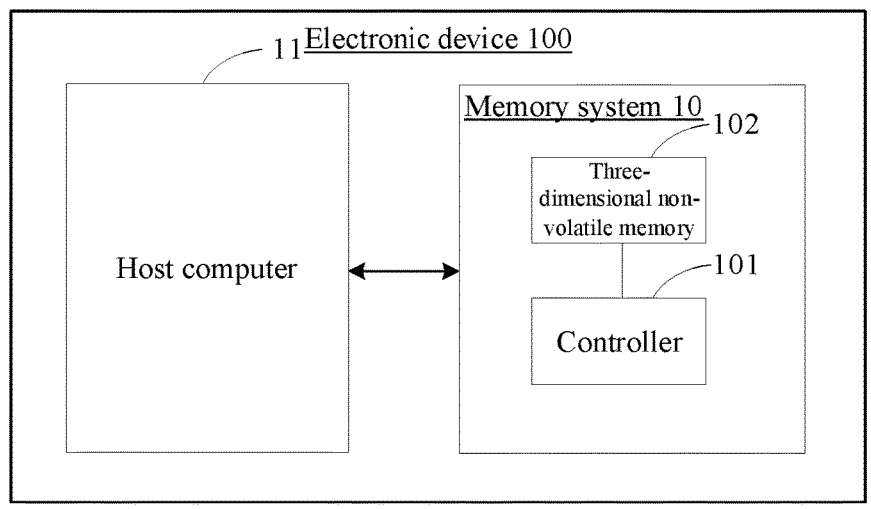
FIG. 13 is a schematic structural diagram of an electronic device according to an example of the present application.

As shown in FIG. 13, FIG. 13 is a schematic structural diagram of an electronic device according to an example of the present application. The electronic device 100 includes a host computer 11 and the memory system 10 in some examples of the present disclosure.

The memory system 10 can be integrated into various types of memory devices, for example, the same package (for example, a Universal Flash Storage (UFS) package or an embedded Multi-Media Card (eMMC) package). That is, the memory system 10 can be applied to and packaged into different types of electronic products, for example, a mobile telephone (a mobile phone), a desktop computer, a tablet computer, a laptop computer, a server, an in-vehicle device, a game console, a printer, a pointing device, a wearable device, a smart sensor, a power bank, a virtual reality (VR) device, an augmented reality (AR) device or any other suitable electronic device with a memory therein.

In some examples, the memory system 10 may include a controller 101 and a three-dimensional non-volatile memory 102. The memory system 10 may be integrated into a memory card.

The memory card includes any one of a PC card (Personal Computer Memory Card International Association, PCM-CIA), a compact flash (CF) card, a smart media (SM) card, a memory stick, a multimedia card (MMC), a secure digital (SD) memory card or a UFS.

In some other examples, referring to FIG. 1, the memory system 10 includes the memory controller 101 and a plurality of three-dimensional non-volatile memories 102. The memory system 10 is integrated into a solid state drive (SSD).

In the memory system 10, in some examples, the memory controller 101 is configured to operate in a low duty-cycle environment like SD cards, CF cards, universal serial bus (USB) flash drives, or other media for use in electronic devices such as personal computers, digital cameras, mobile phones, and the like.

In some other examples, the controller 101 is configured to operate in a high duty-cycle environment such as SSDs or embedded multi-media-cards eMMCs. The SSDs and eMMCs are used as data storage for mobile devices such as smartphones, tablet computers, laptop computers, etc., and enterprise storage arrays.

Some examples of the present disclosure further provide an electronic device. The electronic device may be a mobile phone, a desktop computer, a tablet computer, a laptop computer, a server, an in-vehicle device, a wearable device (for example, a smart watch, a smart band, smart glasses, or the like), a power bank, a game console, a digital multimedia player, or the like.

The electronic device may include the storage system 10 described above, and may also include at least one of a central processing unit, a cache, and the like.

Examples of the present disclosure provide a memory system and an operating method thereof, to resolve the problem that a controller has poor write performance.

To achieve the foregoing objective, the following technical solutions is used in the examples of the present disclosure:

According to an aspect, a memory system is provided. The memory system includes a controller and a three-dimensional non-volatile memory, wherein the three-dimensional non-volatile memory comprising a three-dimensional memory array, and the three-dimensional memory array comprising a plurality of word lines and a plurality of pages that are coupled; the controller being coupled to the three-dimensional non-volatile memory, and the controller is configured to: calculate received page data corresponding to a first word line in units of page data corresponding to one word line to obtain first redundant array of independent disks RAID parity data, and store the first RAID parity data in a parity buffer space; and calculate received page data corresponding to an (i+1)th word line and ith RAID parity data to obtain (i+1)th RAID parity data, and store the (i+1)th RAID parity data in the parity buffer space, wherein the (i+1)th RAID parity data overwriting the ith RAID parity data, and i being a positive integer greater than or equal to 1.

Generally, in a process of storing the RAID parity data by the controller, if the amount of the RAI D parity data is greater than the capacity of the parity buffer space, it is necessary to use a swap operation to share the limited parity buffer space in a time division manner. Because the RAID parity data in the examples of the present application is obtained by calculating page data corresponding to one word line, the parity buffer space can satisfy RAID parity data obtained by calculating page data corresponding to one word line. Therefore, in the examples of the present application, a storage process of RAID parity data can reduce storage pressure and reduce a number of swap operations performed by the controller, thereby improving the write performance of the controller.

In some examples, the controller is further configured to: when a value of i is w−1, write wth RAID parity data into the three-dimensional non-volatile memory, wherein w being a number of word lines corresponding to one fund.

The wth RAID parity data obtained after a plurality of calculations is written into the three-dimensional non-volatile memory, so that a write number of the controller and the three-dimensional non-volatile memory can be reduced, and a memory space required to store RAID parity data in the three-dimensional non-volatile memory can be reduced.

In some examples, the controller is further configured to: in a case that the parity buffer space is insufficient, set a first memory space of a write buffer space for buffering RAID parity data.

The first memory space of the write buffer space is also used for buffering RAID parity data, so that the memory space required for RAID parity data can be satisfied, and it is not necessary to perform a swap operation, thereby implementing the continuity of buffering RAID parity data, and improving the write performance of the controller.

In some examples, the controller is further configured to: store the page data corresponding to the first word line to the page data corresponding to the (i+1)th word line in a second memory space of the write buffer space.

The page data corresponding to the first word line and the (i+1)th word line may be data stored in the three-dimensional non-volatile memory by a host computer. Page data corresponding to each word line is first stored in the second memory space of the write buffer space, so that the rate of reading data from or writing data into the three-dimensional non-volatile memory by the host computer can be increased.

In some examples, a configuration priority of the second memory space of the write buffer space is higher than that of the first memory space.

In a case that the capacity of the second memory space required to store page data corresponding to a plurality of word lines is satisfied, the first memory space is then allocated to the parity buffer space for buffering RAID parity data, so that the storage of the page data corresponding to the plurality of word lines can be ensured.

In some examples, the parity buffer space comprises a parity data buffer space and a garbage collection buffer space, wherein the parity data buffer space being used for buffering the RAID parity data, the garbage collection buffer space being used for buffering garbage collection data, and the garbage collection data comprising RAID parity data corresponding to data that needs to be collected in page data.

The garbage collection buffer space is further allocated in the parity buffer space for buffering RAID parity data corresponding to data that needs to be collected in the page data corresponding to the plurality of word lines. In this way, memory occupied for garbage collection data in the three-dimensional non-volatile memory can be released.

In some examples, the controller is further configured to: perform a swap operation after powering up.

A buffer space is initialized after the controller is powered up, so that the parity buffer space can be cleared to start to buffer the RAID parity data.

In some examples, the controller is further configured to: after a calculation of received page data corresponding to an ith word line is completed, continue to perform the calculation operation on the page data corresponding to the (i+1)th word line.

The controller continuously performs operations such as waiting for calculation and performing calculation, and store the RAID parity data in the parity buffer space after the calculation is completed. It is not necessary to perform a swap operation, thereby implementing the continuity of buffering RAID parity data, and improving the write performance of the controller.

In some examples, RAID parity data is obtained by performing an XOR operation on page data corresponding to one word line.

In some examples, the (i+1)th RAID parity data is used for checking the page data corresponding to the first word line to the (i+1)th word line.

When there is damaged page data in the page data corresponding to the first word line to the (i+1)th word line, the damaged page data can be restored by using the (i+1)th the RAID parity data.

According to another aspect, an operating method of a memory system is provided. The memory system includes a controller and a three-dimensional non-volatile memory, wherein the three-dimensional non-volatile memory comprising a three-dimensional memory array, and the three-dimensional memory array comprising a plurality of word lines and a plurality of pages that are coupled; the controller being coupled to the three-dimensional non-volatile memory, and the method comprises: calculating received page data corresponding to a first word line in units of page data corresponding to one word line to obtain first redundant array of independent disks RAID parity data, and storing the first RAID parity data in a parity buffer space; and calculating received page data corresponding to an (i+1)th word line and ith RAID parity data to obtain (i+1)th RAID parity data, and storing the (i+1)th RAID parity data in the parity buffer space, wherein the (i+1)th RAID parity data overwriting the ith RAID parity data, and i being a positive integer greater than or equal to 1.

In some examples, the method further includes: when a value of i is w−1, writing, by the controller, wth RAID parity data into the three-dimensional non-volatile memory, wherein w being a number of word lines corresponding to one fund.

In some examples, before the storing the first RAID parity data in the parity buffer space, the method further comprises: in a case that the parity buffer space is insufficient, setting, by the controller, a first memory space of a write buffer space for buffering RAID parity data.

In some examples, the method further includes: storing, by the controller, the page data corresponding to the first word line to the page data corresponding to the (i+1)th word line in a second memory space of the write buffer space.

In some examples, a configuration priority of the second memory space of the write buffer space is higher than that of the first memory space.

In some examples, the parity buffer space comprises a parity data buffer space and a garbage collection buffer space, wherein the parity data buffer space being used for buffering the RAID parity data, the garbage collection buffer space being used for buffering garbage collection data, and the garbage collection data comprising RAID parity data corresponding to data that needs to be collected in page data.

In some examples, the method further includes: performing, by the controller, a swap operation after powering up.

In some examples, the method further includes: after a calculation of received page data corresponding to an ith word line is completed, continuing, by the controller, to perform the calculation operation on the page data corresponding to the (i+1)th word line.

In some examples, RAID parity data is obtained by performing an XOR operation on page data corresponding to one word line In some examples, the (i+1)th RAID parity data is used for checking the page data corresponding to the first word line to the (i+1)th word line.

According to still another aspect, a controller is provided, wherein the controller being coupled to a three-dimensional non-volatile memory, the three-dimensional non-volatile memory comprising a three-dimensional memory array, and the three-dimensional memory array comprising a plurality of word lines and a plurality of pages that are coupled; and the controller is configured to: calculate received page data corresponding to a first word line in units of page data corresponding to one word line to obtain first redundant array of independent disks RAID parity data, and store the first RAID parity data in a parity buffer space; and calculate received page data corresponding to an (i+1)th word line and ith RAID parity data to obtain (i+1)th RAID parity data, and store the (i+1)th RAID parity data in the parity buffer space, wherein the (i+1)th RAID parity data overwriting the ith RAID parity data, and i being a positive integer greater than or equal to 1.

In some examples, the controller is further configured to: when a value of i is w−1, write wth RAID parity data into the three-dimensional non-volatile memory, wherein w being a number of word lines corresponding to one fund.

In some examples, the controller is further configured to: in a case that the parity buffer space is insufficient, set a first memory space of a write buffer space for buffering RAID parity data.

In some examples, the controller is further configured to: store the page data corresponding to the first word line to the page data corresponding to the (i+1)th word line in a second memory space of the write buffer space.

In some examples, a configuration priority of the second memory space of the write buffer space is higher than that of the first memory space.

In some examples, the parity buffer space comprises a parity data buffer space and a garbage collection buffer space, wherein the parity data buffer space being used for buffering the RAID parity data, the garbage collection buffer space being used for buffering garbage collection data, and the garbage collection data comprising RAID parity data corresponding to data that needs to be collected in page data.

In some examples, the controller is further configured to: perform a swap operation after powering up.

In some examples, the controller is further configured to: after a calculation of received page data corresponding to an ith word line is completed, continue to perform the calculation operation on the page data corresponding to the (i+1)th word line.

In some examples, RAID parity data is obtained by performing an XOR operation on page data corresponding to one word line.

In some examples, the (i+1)th RAID parity data is used for checking the page data corresponding to the first word line to the (i+1)th word line.

According to still another aspect, an electronic system is provided. The electronic system includes a host computer and the foregoing memory system.

It may be understood that for the beneficial effects that can be achieved by the memory system and the operating method thereof provided in the foregoing examples of the present disclosure, reference may be made to the beneficial effects of the memory controller above. Details are not described herein again.

The foregoing descriptions are merely specific implementations of the present disclosure, but are not intended to limit the protection scope of the present disclosure. Any variation or replacement that may be readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A memory system, the memory system comprising:
a controller; and
a three-dimensional non-volatile memory, wherein the three-dimensional non-volatile memory includes a three-dimensional memory array, the three-dimensional memory array includes a plurality of word lines and a plurality of pages that are coupled, the controller coupled to the three-dimensional non-volatile memory, and the controller is configured to at least:
calculate received page data corresponding to a first word line in units of page data corresponding to one word line to obtain first redundant array of independent disks (RAID) parity data, and store the first RAID parity data in a parity buffer space; and
calculate received page data corresponding to an (i+1)th word line and ith RAID parity data to obtain (i+1)th RAID parity data, and store the (i+1)th RAID parity data in the parity buffer space, wherein the (i+1)th RAID parity data overwrites the ith RAID parity data, and i is a positive integer greater than or equal to 1.

2. The memory system of claim 1, wherein the controller is further configured to at least, when a value of i is w−1, write wth RAID parity data into the three-dimensional non-volatile memory, wherein w being a number of word lines corresponding to one fund.

3. The memory system of claim 1, wherein the controller is further configured to at least:
determine that the parity buffer space is insufficient, the determination based on a memory space of the parity buffer space and a RAID parity data; and
in a case that the parity buffer space is insufficient, set a first memory space of a write buffer space for buffering RAID parity data.

4. The memory system of claim 3, wherein the controller is further configured to at least store the page data corresponding to the first word line to the page data corresponding to the (i+1)th word line in a second memory space of the write buffer space.

5. The memory system of claim 4, wherein a configuration priority of the second memory space of the write buffer space is higher than a configuration priority of the first memory space.

6. The memory system of claim 4, wherein the parity buffer space includes a parity data buffer space and a garbage collection buffer space, wherein the parity data buffer space is used for buffering the RAID parity data, the garbage collection buffer space is used for buffering garbage collection data, and the garbage collection data includes RAID parity data corresponding to data that needs to be collected in page data.

7. The memory system of claim 1, wherein the controller is further configured to at least:
determine the parity buffer space; and
perform a swap operation after powering up, the performance of the swap operation to empty the parity buffer space prior to calculation of received page data.

8. The memory system of claim 1, wherein the controller is further configured to at least after a calculation of received page data corresponding to an ith word line is completed, continue to perform the calculation operation on the page data corresponding to the (i+1)th word line.

9. The memory system of claim 1, wherein the RAID parity data is obtained by performing an XOR operation on page data corresponding to one word line.

10. The memory system of claim 1, wherein the (i+1)th RAID parity data is used for checking the page data corresponding to the first word line to the (i+1)th word line.

11. An operating method of a memory system, the method comprising:
calculating, by g controller coupled to a three-dimensional non-volatile memory, the three-dimensional non-volatile memory including a three-dimensional memory array, the three-dimensional memory array including a plurality of word lines and a plurality of pages that are coupled, received page data corresponding to a first word line in units of page data corresponding to one word line to obtain first redundant array of independent disks (RAID) parity data, and storing the first RAID parity data in a parity buffer space; and
calculating, by the controller, received page data corresponding to an (i+1)th word line and ith RAID parity data to obtain (i+1)th RAID parity data, and storing the (i+1)th RAID parity data in the parity buffer space, wherein the (i+1)th RAID parity data overwrites the ith RAID parity data, and i is a positive integer greater than or equal to 1.

12. The method of claim 11, wherein the method further includes when a value of i is w−1, writing, by the controller, wth RAID parity data into the three-dimensional non-volatile memory, wherein w being a number of word lines corresponding to one fund.

13. The method of claim 11, wherein, before the storing the first RAID parity data in the parity buffer space, the method further includes:
determining, by the controller, that the parity buffer space is insufficient, the determination based on a memory space of the parity buffer space and a RAID parity data; and
in a case that the parity buffer space is insufficient, setting, by the controller, a first memory space of a write buffer space for buffering RAID parity data.

14. The method of claim 13, wherein the method further includes storing, by the controller, the page data corresponding to the first word line to the page data corresponding to the (i+1)th word line in a second memory space of the write buffer space.

15. The method of claim 14, wherein a configuration priority of the second memory space of the write buffer space is higher than a configuration priority of the first memory space.

16. The method of claim 14, wherein the parity buffer space includes a parity data buffer space and a garbage collection buffer space, wherein the parity data buffer space is used for buffering the RAID parity data, the garbage collection buffer space is used for buffering garbage collection data, and the garbage collection data includes RAID parity data corresponding to data that needs to be collected in page data.

17. The method of claim 11, wherein the method further includes:
determining, by the controller, the parity buffer space; and
performing, by the controller, a swap operation after powering up, the performance of the swap operation to empty the parity buffer space before the calculation of received page data.

18. The method of claim 11, wherein the method further includes after a calculation of received page data corresponding to an ith word line is completed, continuing, by the controller, to perform the calculation operation on the page data corresponding to the (i+1)th word line.

19. The method of claim 11, wherein RAID parity data is obtained by performing an XOR operation on page data corresponding to one word line.

20. An electronic system comprising:
- a host computer; and
- a memory system, the memory system including a controller and a three-dimensional non-volatile memory, wherein the three-dimensional non-volatile memory includes a three-dimensional memory array, and the three-dimensional memory array includes a plurality of word lines and a plurality of pages that are coupled, the controller coupled to the three-dimensional non-volatile memory, and the controller is configured to at least:
    - calculate received page data corresponding to a first word line in units of page data corresponding to one word line to obtain first redundant array of independent disks (RAID) parity data, and store the first RAID parity data in a parity buffer space; and
    - calculate received page data corresponding to an (i+1)th word line and ith RAID parity data to obtain (i+1)th RAID parity data, and store the (i+1)th RAID parity data in the parity buffer space, wherein the (i+1)th RAID parity data overwrites the ith RAID parity data, and i is a positive integer greater than or equal to 1.

* * * * *

UNITED STATES PATENT AND TRADEMARK OFFICE
CERTIFICATE OF CORRECTION

| | | |
|---|---|---|
| PATENT NO. | : 12,079,085 B2 | Page 1 of 1 |
| APPLICATION NO. | : 18/148865 | |
| DATED | : September 3, 2024 | |
| INVENTOR(S) | : Luo et al. | |

It is certified that error appears in the above-identified patent and that said Letters Patent is hereby corrected as shown below:

In the Claims

In Column 20, Claim 11, Line 6, delete "g" and insert --a--.

Signed and Sealed this
Eighth Day of October, 2024

Katherine Kelly Vidal
*Director of the United States Patent and Trademark Office*